L. R. VEATCH.
FEED MIXER.
APPLICATION FILED JULY 24, 1919.

1,353,978.

Patented Sept. 28, 1920.
2 SHEETS—SHEET 2.

INVENTOR
Leslie R. Veatch
BY
J. W. Ellis
ATTORNEY

UNITED STATES PATENT OFFICE.

LESLIE R. VEATCH, OF BUFFALO, NEW YORK.

FEED-MIXER.

1,353,978.  Specification of Letters Patent.  Patented Sept. 28, 1920.

Application filed July 24, 1919.  Serial No. 312,907.

*To all whom it may concern:*

Be it known that I, LESLIE R. VEATCH, a citizen of the United States of America, residing in the city of Buffalo, county of Erie, and State of New York, have invented certain new and useful Improvements in Feed-Mixers, of which the following is a full, clear, and exact description.

My invention relates generally to devices for the mixing of feed for live stock, poultry and the like.

The principal objects of my invention have been to provide a mixer which will thoroughly and uniformly mix feeds; one which shall efficiently do this work with a minimum expenditure of time; and one which shall be comparatively cheap to manufacture, and simple and easy to operate.

The above objects and advantages, as well as others, which will be apparent to those skilled in the art, have been accomplished by the device shown in the accompanying drawings, of which:

Figure 1:
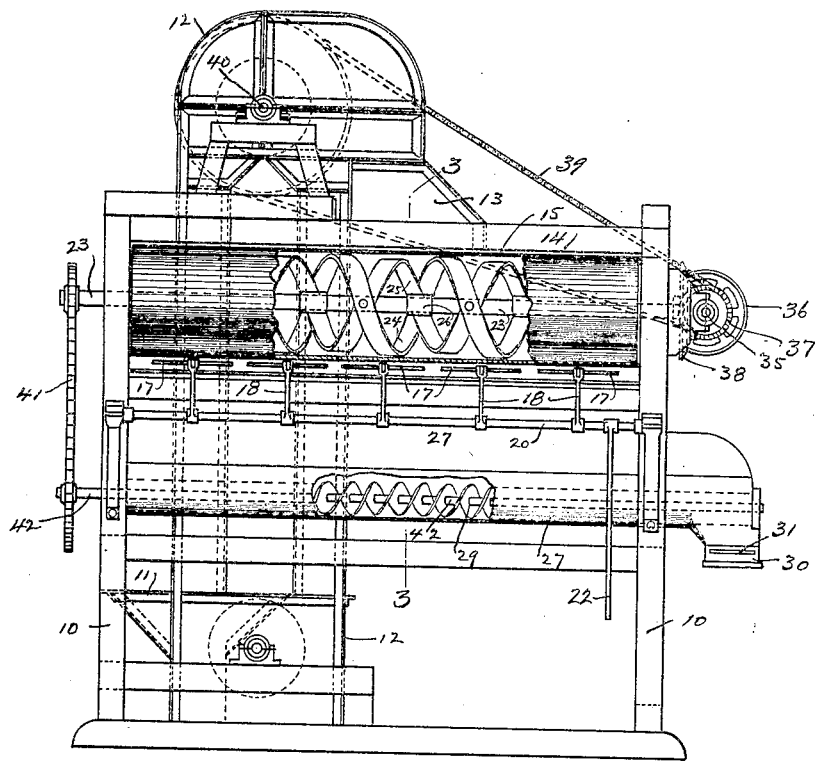
Figure 1 is a side elevation of my device, partly in section.
Figure 3:
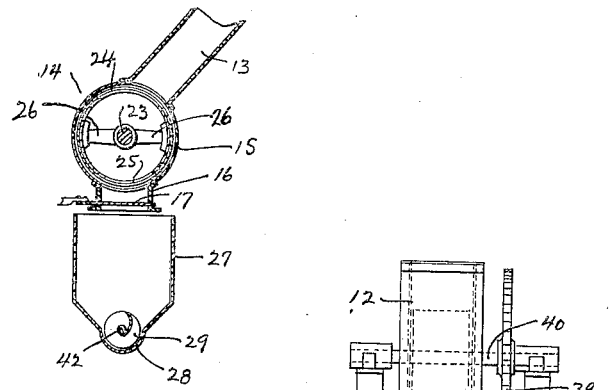
Fig. 3 is a fragmentary, sectional view taken on line 3—3 of Fig. 1.
Figure 2:
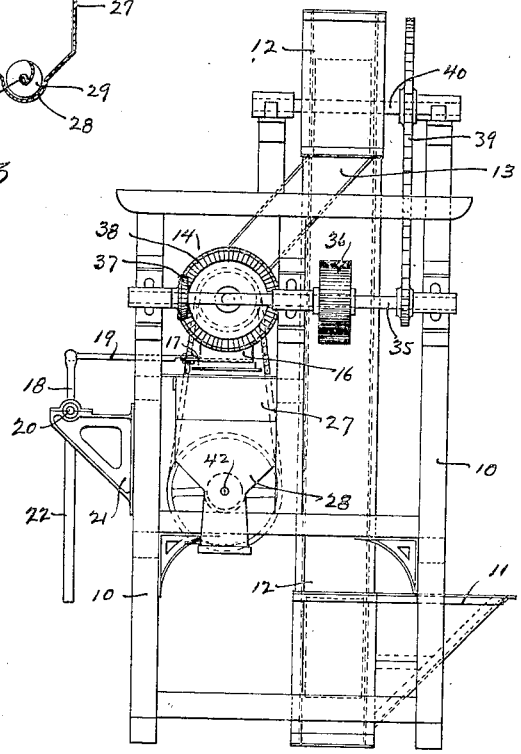
Fig. 2 is an end elevation of the same.

In the drawings, 10 represents the frame work which supports all the parts of my device. This frame work may be made of suitable timber or structural steel or may be formed by the floors or other structural parts of the building in which the mixer is installed.

11 is a charging hopper in which all the feed to be mixed is first placed. This hopper opens into the bottom of a vertical conveyer 12 of any suitable type. This conveyer extends upwardly to the top of the device, and the feed which is conducted upwardly by the buckets thereof is deposited into a chute 13.

14 is the mixer proper of my device, which comprises an outer cylindrical casing 15 to which the lower end of the chute 13 is connected, and into which the feed is discharged from the chute. The casing 15 of the mixer is provided with a discharge neck 16, which forms a discharge for the mixer. This neck extends the entire length of the mixer casing, and a number of sliding valves 17 are arranged therein, whereby the discharge openings of the neck 16 are closed or opened at will. Each of the slides 17 is connected to a lever 18 by means of a link 19. The levers 18 are rigidly secured to a shaft 20, suitably supported in the brackets 21. Also rigidly mounted upon the shaft 20 is an operating arm 22. By means of this operating arm all of the sliding valves 17 may be opened or closed at the same time. A mixing element is rotatably mounted within the mixer casing 15 and comprises a shaft 23, suitably journaled in the ends of the mixer 14 and two continuous mixing blades 24 and 25 are made preferably of material of rectangular cross-section and formed in the shape of a helix, the blade 24 being wound right-handedly and the blade 25 left-handedly. These blades are preferably arranged within one another and they are of such a diameter that they run close to the inner surface of the casing 15. The blades 24 and 25 are supported and rotated by a plurality of arms 26, rigidly carried by the shaft 23. The purpose of these blades is not to convey the stock from one end of the casing to the other, but to thoroughly mix it by working it back and forth.

Arranged immediately beneath the discharge neck 16 of the mixer 14 is a relay bin 27, which preferably has a capacity equal to that of the mixer 14. When the feed has been properly mixed and commingled, the lever 22 is operated so as to withdraw the slides 17 and dump the contents of the mixer. The mixed feed will fall into the relay bin 27 where it will remain until it is ready to be put into bags. A conveyer trough 28 is formed at the bottom of the relay bin 27 and an endless conveyer 29 is rotatably mounted therein. At the end of the trough 28 is a bag-filling spout 30, which is provided with a valve 31. The bags in which the feed is to be placed are attached to the spout 30 and may be filled with feed therefrom, when the valve 31 is opened.

The different shafts of my device may be driven in any suitable manner. For illustration, I have shown a main drive shaft 35, having a pulley 36 by which power may be applied thereto. A bevel gear 37 is attached to this shaft and meshes with a bevel gear 38, mounted upon the mixer shaft 23. The buckets of the vertical conveyer 29 are driven preferably by means of the sprocket chain 39, engaging sprockets on the main shaft 35 and the conveyer shaft 40. The endless conveyer 29 is driven preferably from the mixer shaft 23 by means of the sprocket chain 41, connected with sprockets secured to the shaft 23 and the shaft 42 of the conveyer.

From the foregoing it will be seen that, by my device, it is possible to mix one batch of feed while a previously mixed batch is being put up in containers and, as the entire contents of the mixer may be instantly dumped, it will be seen that the mixing and bagging of feed by my device is accomplished with a minimum loss of time.

Obviously, some modifications of the details herein shown and described may be made without departing from the spirit of my invention or the scope of the appended claims; and I do not, therefore, wish to be limited to the exact embodiment herein shown and described, the form hereinbefore described being merely a preferred embodiment thereof.

Having thus described my invention, what I claim is:

1. The combination in a mixing device, of a mixer comprising a casing, a mixing member having a right-hand helical blade and a left-hand helical bade, said blades being rotatable within the casing and means extending along the entire length of the mixer for instantly dumping the entire contents of the mixer.

2. The combination in a mixing device, of a mixer comprising a casing, a mixing member having a right-hand helical blade and a left-hand helical blade, said blades being rotatable within the casing, and a plurality of valves extending along substantially the entire length of the mixer for the mixer, whereby its entire contents may be dumped at once.

3. A mixing device comprising a mixer, means for conducting feed to the mixer, means for instantly dumping the entire contents of the mixer, and a relay bin located beneath the mixer.

4. A mixing device comprising a mixer, means for conducting feed to the mixer, a plurality of sliding valves arranged at the bottom of the mixer, and means for operating the valves simultaneously.

5. A mixing device comprising a mixer, means for conducting feed to the mixer, means for instantly dumping the entire contents of the mixer, a relay bin located beneath the mixer, a conveyer trough formed at the bottom of the bin, a conveyer rotatably mounted in the trough, and bag filling means at the end of the trough.

In testimony whereof, I have hereunto signed my name.

LESLIE R. VEATCH.